Patented Apr. 17, 1923.

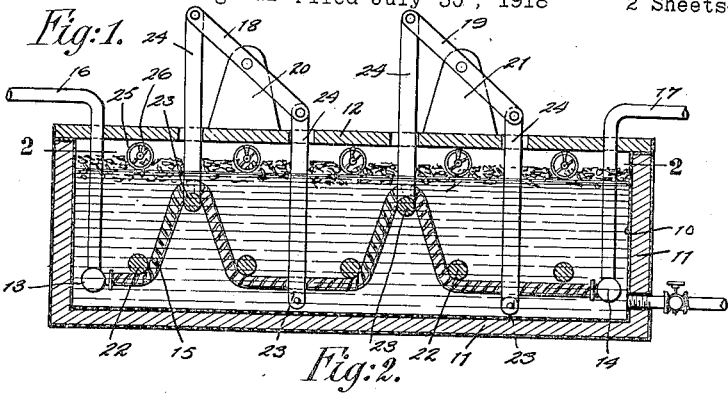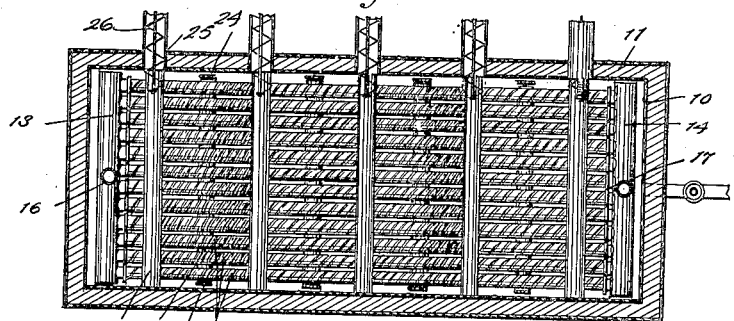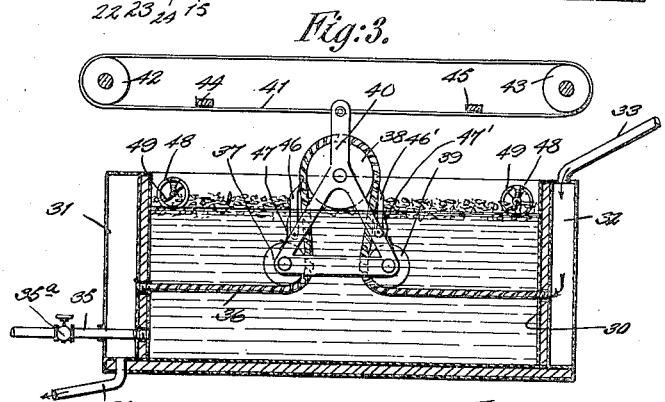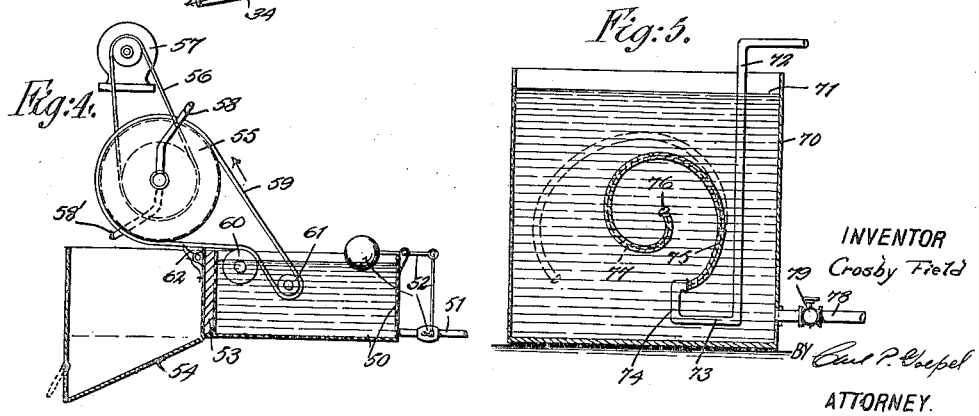

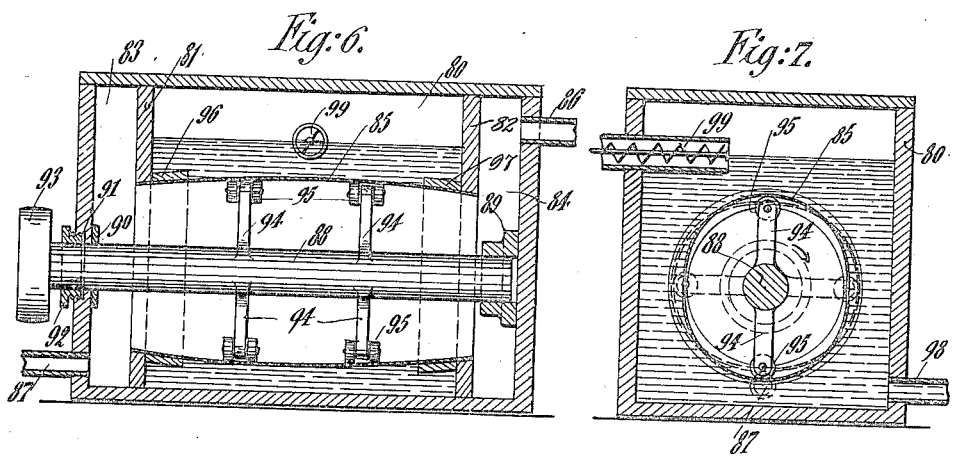
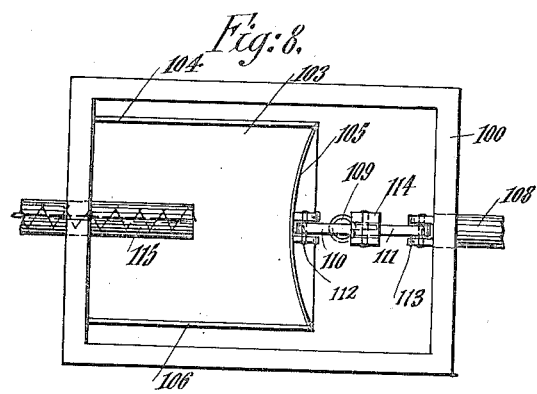
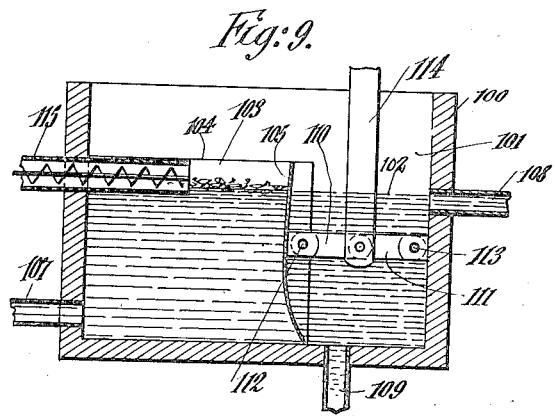

1,451,901

UNITED STATES PATENT OFFICE.

CROSBY FIELD, OF YONKERS, NEW YORK, ASSIGNOR TO CHEMICAL MACHINERY CORPORATION, OF NEW YORK, N. Y.

APPARATUS FOR TRANSFERRING HEAT.

Application filed July 30, 1918, Serial No. 247,365. Renewed May 2, 1922. Serial No. 558,040.

*To all whom it may concern:*

Be it known that I, CROSBY FIELD, a citizen of the United States, and a resident of Yonkers, in the county of Westchester, State of New York, have invented certain new and useful Improvements in Apparatus for Transferring Heat, of which the following is a specification.

The present invention relates to improvements in methods and apparatus for transferring heat, and is particularly intended for the production of so called "mush ice," an object of the invention being to enable such ice to be produced in a practical and economical manner in chemical or other plants where such ice is used.

It is also proposed by the use of suitable heat transference media, to adapt the invention to cooking, heating or other processes, particularly where a precipitation or coating may be formed and where it is desirable to remove such formation, which would tend to clog the apparatus, or prevent transference of heat.

With these and other objects in view, embodiments adapted to carry out my invention are shown in the accompanying drawings and these embodiments will be hereinafter more fully described with reference thereto and the invention will be finally pointed out in the claims.

In the accompanying drawings:

Fig. 1 is a vertical sectional view, partly in elevation, showing one method of carrying out my invention.

Fig. 2 is a horizontal sectional view thereof taken along the line 2—2 of Fig. 1.

Fig. 3 is a vertical sectional view partly in elevation, of a modified form.
Fig. 4 is a view partly in section and partly in elevation, showing a further modified apparatus for carrying out the invention;

Fig. 5 is a view partly in section and partly in elevation showing a still further modified apparatus;

Fig. 6 is a vertical longitudinal sectional view of a still further modified apparatus for carrying out my invention;
Fig. 7 is a vertical transverse sectional view thereof;

Fig. 8 is a plan view of another modified apparatus; and

Fig. 9 is a vertical longitudinal sectional view thereof.

Similar reference characters indicate corresponding parts throughout the several figures of the drawings.

Referring to the drawings and more particularly to Figure 1 thereof, the embodiment shown therein comprises a tank or vessel 10, insulated at its side and bottom with lagging 11 and provided with a cover 12. The tank is filled with pure water, when used for manufacturing "mush ice" although it will be understood that other substances capable of being frozen or otherwise treated may be contained therein. Secured within the tank at its ends and relatively near the bottom there are provided headers 13 and 14 which are connected by a plurality of flexible tubes 15, these being preferably of metal and of the well-known commercial type and their ends are in communication with the brine or other refrigerants which flow into headers 13 and 14, the refrigerant being supplied to the header 13 by means of a supply pipe 16 and is exhausted from the header 14 through the exhaust pipe 17. The tubes may be of any suitable number and are spaced apart slightly as shown, for instance, in Figure 2.

Instead of the tubes I may also employ solid wires or other suitable means which will conduct cold from the refrigerant, or is suitable for heat transference. The principle of the invention as applied to the formation of "mush ice," is that a layer of ice will form about the cylindrical surface of the submerged tubes, and when this reaches a suitable thickness as for instance one eighth of an inch, the tube is warped or otherwise changed in its position, so that the ice is cracked therefrom. It has been found in practice, that the ringlets of ice formed upon the tubes are readily cracked longitudinally of the axis of the tubes. This ice, upon being released from the tubes, rises to the upper surface of the water in the tank and may thereupon be removed by any suitable means. Although primarily intended for the manufacture of "mush ice," the invention has already been successfully adapted to other processes involving heat transfer in which a solid or semi-solid material precipitates out of the solution upon the media through which the heat transfer took place, this action sometimes resulting in the formation of a hard crust. This precipitate may readily be removed by warping or flexing the tubes, according to the present invention, and falls to the bottom of the tank, if heavier than the liquid from which it was precipitated, and rises to the top of the liquid in those cases where it is lighter, as for instance, in the formation of ice. As a particular example of the use of my invention in processes involving heat transfer, other than the formation of "mush ice," may be mentioned the evaporation to partial dryness of calcium salts of organic acids.

In Figures 1 and 2 I have shown one means of bringing about the warping of the flexible tubes, consisting of a pair of walking beams 18 and 19 pivotally mounted upon suitable standards 20 and 21 and adapted to be operated in unison by means of cranks or pulleys (not shown). At the side of the flexible tubes and in spaced relation to each other there are provided a plurality of fixed transverse supports or rods 22 and arranged at the under side of the flexible tubes and in alternate relation to the fixed transverse supports 22 there are provided transverse rods 23 carried at the ends of the arms 24 extending downwardly through the cover 12 from the ends of the walking beams 18 and 19. Through the operation of the walking beams the flexible tubes are caused to change their configuration and as above pointed out this action readily causes the layer of ice or other precipitate formed upon the flexible tubes to be cracked off, whence it rises to the surface and is removed through the ports 25 by means of suitable screw conveyors 26 arranged in said ports.

In Figure 3 I have shown a modified form of apparatus in which the tank or vessel 30 is provided at its ends with compartments 31 and 32 and into each brine freezing gas or other suitable refrigerant is adapted to be circulated or expanded, such refrigerant being supplied to the compartment 31 by means of a supply pipe 33 and carried off from the compartment 32 by means of an exhaust pipe 34. Water may be supplied to the tank 30 by means of a supply pipe 35 provided with a control valve 35ª. The ends of the tank are connected by a plurality of flexible tubes 36 which are in communication at their ends with the compartments 31 and 32, so that the refrigerant circulates through the compartments and the flexible tubes.

The means for warping the flexible tubes to remove the layer of ice or other precipitate formed thereon, consists of three rollers 37, 38, and 39 mounted upon frames 40 provided at the ends of the rollers, and which are connected to the cable 41, carried upon the pulleys 42 and 43 and adapted to be moved back and forth so that the rollers are conveyed from one end of the tank to the other engaging all parts of the flexible tubes which are threaded over the rollers. I have indicated diagrammatically at 44 and 45 stops adapted to be engaged by the frame, and by connection with suitable electrical or mechanical means to reverse the direction of movement of the cable. Scrapers 46 and 46′ are supported upon the frames 40 and these are held in yielding engagement with the surface of flexible tubes by means of springs 47 and 47′, to insure complete removal of the ice formed thereon. As the ice is removed from the flexible tubes and rises to the surface it is conveyed from the tank through ports 48 in which are provided conveyors 49.

In Figure 4 I have shown a further modified apparatus for carrying out my invention and which consists of a tank 50 containing water, supplied thereto by a supply pipe 51, controlled by a float valve 52 so that the water is always maintained at the proper level. At the end of the tank 50 and separated therefrom by lagging 53 there is provided a receiving tank or hopper 54, adapted to receive the formed ice or other precipitate produced. Above the said hopper 54 there is mounted a cylindrical drum 55 adapted to be rotated by means of a belt 56 and motor 57. The ends of the drum are closed and brine or other suitable refrigerant is adapted to be circulated or expanded therein through suitable connections 58, 58′.

The surface of the drum is relatively large and a plurality of wires 59 are carried thereover and extend downwardly into the water over pulleys 60 and 61, these wires being preferably arranged close together so as to form a relatively large water conveying surface. Instead of wires I may also employ a wide flat belt preferably of metal, or I may employ a plurality of belts. A scraper 62 is arranged at the ends of the hopper adjacent the water tank for the purpose of entirely removing the ice or other precipitate from the wires before the same again enter the liquid.

The operation is as follows:

As the drum is rotated the wires or belts are moved in the direction of the arrow, the surface thereof being covered with water, and as this water comes into relation with the surface of the drum 55 the same is frozen upon the wires or belts, this freezing action being completed before the same leave the drum. Upon leaving the drum the wires assume a straight position so that the ice formed thereon is cracked and drops into the hopper 54. Should any of this ice fail to be removed by this cracking operation the scraper 62 will cause the same to be precipitated into the hopper.

In Figure 5 I have shown a still further modification which consists of a tank 70 containing water or other liquid up to the level 71 and within the tank there is provided a pipe 72 extending toward the bottom thereof, bent laterally at 73 and turned upwardly at its end as at 74. To the end of this pipe there is secured a flexib'e tube 75 closed at its end 76 and provided with a coil spring 77 adapted to normally coil the flexible tube. This spring may either be contained within the tube or it may be secured to the outside of the same, or instead, the tube itself may be inherently elastic. Brine, freezing gas, or other refrigerant is adapted to be introduced within the flexible tube causing a layer of ice to be formed thereon. By increasing the pressure of the fluid within the flexible tube the same is caused to move toward a straight position as indicated in dotted lines, thereby cracking the ice and causing the same to be removed therefrom, this ice floating to the ton of the water where it may be removed in any suitable manner, as for instance by means of a screw conveyor as shown in the other forms of my invention. Water or other liquid is supplied to the tank by means of a supply pipe 78, provided with a valve 79.

In Figures 6 and 7 I have illustrated a still further apparatus adapted to carry out my invention, which comprises a covered tank 80, provided with a lagging and having at each end thereof barriers or partitions 81 and 82 forming a jacket 83 and 84 at each end. These jackets are connected by means of a tube 85 of thin flexible material, and through which brine or other suitable refrigerant is adapted to flow from the jacket 82 to the jacket 83, a supply pipe 86 being provided for the jacket 84 and an exhaust pipe 87 being provided for the jacket 83. Liquid to be frozen such for instance as water, is contained in the tank between the two end jackets up to the level 88 and it completely surrounds the flexible tube 85.

Normally the flexible tube is circular in cross section but in order to warp the same so as to remove the ice formed upon its outer surface, there is provided a shaft 88 extending axially therethrough, being journa'ed at one end in the bearing 89 while at its other end it passes through a collar 90 and a packing ring 91, held in place by a nut 92 to make the bearing liquid tight. A pulley 93 is provided upon the end of the shaft and is adapted to rotate the same through any source of power in the direction of the arrow. In spaced relation upon the shaft there are provided radial arms 94 carrying at their ends ro'lers 95 which engage the inner surface of the tubular member, the distance between the peripheries of the diametrically opposite rollers being greater than the diameter of the tubular member so that as the shaft rotates the tubular member assumes an elliptical cross section, the longitudinal axis of which constantly rotates, the tubular member taking in succession the positions shown by the dotted lines in Figure 7. It will be noted that these rollers are not disposed close to the ends of the flexible tubes. The purpose of this is to allow sufficient flexibility to permit the central part of the flexible tube to warp without putting too great a strain on the ends which are connected to the partitions 81 and 82. It is essential, therefore, that the end parts of the flexible tube be not permitted to accumulate ice and consequently they are covered by flexible rings 96 and 97 of insulating material.

Water or other liquid to be frozen is supplied to the tank by means of a pipe 98 controlled by a valve (not shown), and as the formed ice floats to the top of the water it is conveyed from the tank by means of a screw conveyor 99.

In the still further modified form of construction shown in Figures 8 and 9 a tank 100 is provided, divided into two compartments, the outer compartment 101 containing brine or other refrigerant up to the level 102, while the inner compartment 103 contains water or other material to be frozen. These compartments are separated from each other by partitions 104, 105 and 106 of which at least one is very flexible, and preferably the remainder are of some flexibility. The liquid to be frozen is fed to the compartment 103 by means of a pipe 107, this being controlled by a suitable valve (not shown) while the refrigerant is fed to the compartment 101 by means of a pipe 108 and is exhausted therefrom by means of a pipe 109, the pipe 108, being controlled by a valve (not shown) so as to maintain the level of the refrigerant at 102.

The low temperature produced causes ice to form upon the inside of the thin flexible partition 105, the flexible partitions 104 and 106 being preferably made of insulating material so that ice will form only upon the partition 105. This partition is caused to be warped by means of a pair of pivoted links 110 and 111 respectively, pivoted to the said partition at 112 and to the wall of the tank at 113 while the pivotal connection between the links is connected to a lever 114 to which reciprocating motion is imparted by any suitable means, causing the same to rise and fall by means of the links 110 and 111 and the partition 105 to be warped to and fro so that the ice formed upon its inner surface is cracked therefrom. As this ice is formed it floats to the top of the water and is removed by means of a screw conveyor 115.

It will be understood that where I have referred in the description of my invention to water and the formation of ice that I do not wish to limit myself to this particular process but on the other hand it is within the principle of my invention to utilize the process and apparatus in connection with other liquids or solutions and in the formation of other materials than ice. Also the invention may be used for agitating liquids or semi-liquids and at the same time conducting heat to such materials, the agitation also preventing the accumulation of material on the heat conducting flexible tube. The apparatus will also prove valuable for heat transfer in cases where no precipitate forms. The thin walls of the tubes, the gentle agitation, etc. are all advantageous whether the precipitate is formed or not, the heat transfer being accelerated because of the breaking down of the minute film of vapor that is supposed to surround every heat transfer medium immersed in a liquid. In this connection attention is invited to my other patent application for agitators, filed July 30, 1918, Serial No. 247366, and in which agitation is brought about by fluid pressure means.

I have illustrated and described various means of carrying out the principle of my invention but it will be understood that numerous other means may be resorted to for accomplishing the same result within the spirit and scope of my invention as defined in the appended claims.

I claim:

1. In a heat transference apparatus, heat transfer means adapted by its capacity of heat transference to convert a fluid into solid form, and constituting a collector of the solidified material, said means being constructed whereby its normal conformation may be temporarily altered to effect the dislodgment or separation of the solid material from the heat transfer means.

2. In a heat transference apparatus, a heat transfer element movable in a fluid, convertible into solid form by heat transference, said element being constructed to effect the continuous dislodgment of the solidified material from its surfaces during the movement of said element in the fluid.

3. In a heat transference apparatus, heat transfer means adapted to extend within a fluid and, by heat transference convert the fluid in immediate contact with said means into solid form, said means constituting a collector of the solidified material, and means for temporarily altering the normal form of said heat transfer means within the fluid to thereby fracture the film of solid material which has collected thereon and cause the same to scale off or separate from said heat transfer means.

4. In a heat transference apparatus, a fluid containing tank, flexible heat transfer means disposed within the tank and through which the heat is directly transferred to convert the fluid in immediate contact with said transfer means into solid form, said means constituting a collector of the solidified material, and means for flexing said heat transfer means to fracture the film of material thereon and cause the material to flake or scale off from said flexible means.

5. In a heat transference apparatus, a tank adapted to contain a fluid, means for conducting a heat transfer medium through the fluid to thereby convert the fluid in immediate contact with said means into solid form, said means constituting a collector of the solid deposit, and means for imparting a movement to the conducting means relative to the tank to break up the deposit on said means and thereby facilitate its easy removal.

6. In a heat transference apparatus, a tank adapted to contain a fluid, a flexible element to extend within the fluid, means for subjecting one side of the flexible element to the action of a heat transfer medium whereby the fluid in immediate contact with the opposite side of said element is converted into fluid form and caused to deposit in a thin film upon said element, and mechanical means coacting with said flexible element to flex the same within the fluid and fracture the film of material thereon, to cause said material to flake or scale off from said element.

7. In a heat transference apparatus, a tubular flexible element adapted to be positioned in a fluid to be treated, means for supplying a heat transfer medium to the interior of said element whereby the fluid in the immediate vicinity of said element is converted into solid form and deposited upon the exterior thereof in a thin film, and means for flexing said tubular element to fracture the film of material thereon and cause the same to scale off into the fluid.

8. In a heat transference apparatus for producing "flake" ice, a tank adapted to contain a liquid, flexible heat transfer means disposed within the liquid and directly subjected to the action of a refrigerating agent whereby the liquid in the immediate vicinity of said means is congealed and deposited on the heat transfer means in the form of an ice film, and means for flexing said heat transfer means to fracture the ice film and cause the same to separate from the heat transfer means in a flaky or flocculent condition.

9. In a heat transference apparatus for producing "flake" ice, a tank adapted to contain a liquid, flexible conduits extending through the tank to conduct a refrigerant through the liquid therein whereby the liquid in the immediate vicinity of the conduits is congealed and caused to deposit in the form of ice films upon the exterior of the conduits, and means for flexing said conduits to cause the fracture of the ice films thereon and effect their separation from the conduits in a flaky or flocculent condition.

10. In the solidification of fluid materials through the medium of heat transference, that step which consists in transferring heat directly to the material being treated through the medium of a locally deformable element extending into the material whereby the solidified material is collected on said element, and then effecting a local deformation of said element whereby the solidified material is dislodged therefrom and the rate of heat transfer accelerated to immediately effect the replacement of the dislodged material with renewed accretions of the solidified material.

11. In a crystallizing receptacle, walls made of flexible and impermeable material for receiving the crystals, supporting means for said walls and means to cause a deformation of said walls in order to produce the detachment of the crystals.

12. In a crystallizing receptacle, walls made of flexible and impermeable material for receiving the crystals, supporting means for said walls and means to displace said walls with respect to said supporting means in order to produce the detachment of the crystals.

13. In the art of heat transference, th method which consists in directly subjecting one side of a flexible element disposed in the material to be treated to the action of a heat transfer medium to thereby effect a deposit of the material in the form of a thin film upon the opposite side of said flexible element and accelerating the rate of heat transfer to the material by flexing said element within the material whereby the film deposit thereon is fractured, and its removal from the surface of the flexible element effected.

14. In an apparatus for recovering crystalline materials, a structurally continuous, imperforate, flexible collector to receive the crystals and means to cause a deformation of said flexible collector in order to produce the detachment of the crystals.

15. A crystallizing receptacle having a flexible wall of impermeable material for receiving the crystals, and means to cause a deformation of said wall in order to produce the detachment of the crystals.

In testimony that he claims the foregoing as his invention, he has signed his name hereunder.

CROSBY FIELD.